United States Patent [19]

Bender et al.

[11] Patent Number: 5,057,964
[45] Date of Patent: * Oct. 15, 1991

[54] SURGE PROTECTOR FOR TELECOMMUNICATIONS TERMINALS

[75] Inventors: David K. Bender, Tequesta; Richard R. Lathrop, Jr., Royal Palm Beach, both of Fla.

[73] Assignee: Northern Telecom Limited, Montreal, Canada

[*] Notice: The portion of the term of this patent subsequent to Mar. 2, 2008 has been disclaimed.

[21] Appl. No.: 522,510

[22] Filed: May 14, 1990

Related U.S. Application Data

[63] Continuation of Ser. No. 942,771, Dec. 17, 1986, abandoned.

[51] Int. Cl.$^5$ .............................................. H02H 9/04
[52] U.S. Cl. .................................... 361/118; 361/119; 338/195; 338/95; 338/288
[58] Field of Search ............... 361/397, 402, 119, 118, 361/126, 58; 338/21, 95, 195, 288, 289, 296, 297, 307, 308

[56] References Cited

U.S. PATENT DOCUMENTS

| | | | |
|---|---|---|---|
| 3,743,887 | 7/1973 | Kerrigh et al. | 361/86 |
| 3,781,749 | 12/1973 | Iles et al. | 338/25 |
| 3,860,465 | 1/1975 | Matzner et al. | 338/195 X |
| 4,146,867 | 3/1979 | Blangeard et al. | 338/308 |
| 4,160,897 | 7/1979 | Makino | 338/288 X |
| 4,197,521 | 4/1980 | Rovnyak | 338/195 |
| 4,277,811 | 7/1981 | Sato | 361/98 |
| 4,284,970 | 8/1981 | Berrin et al. | 338/195 |
| 4,298,856 | 11/1981 | Schuchardt | 338/195 |
| 4,378,489 | 3/1983 | Chabinsky et al. | 338/309 |
| 4,415,945 | 11/1983 | Periot | 361/100 |
| 4,418,474 | 12/1983 | Barnett | 338/89 X |
| 4,600,963 | 7/1986 | Hentrich et al. | 361/98 |

FOREIGN PATENT DOCUMENTS

| | | | |
|---|---|---|---|
| 2830732 | 1/1980 | Fed. Rep. of Germany | 338/297 |
| 1236580 | 6/1971 | United Kingdom | 338/308 |
| 1566151 | 4/1980 | United Kingdom | 338/195 |
| 2088644A | 6/1982 | United Kingdom . | |
| 2122414A | 1/1984 | United Kingdom . | |
| 2147480A | 5/1985 | United Kingdom | 338/23 |
| 2168540A | 6/1986 | United Kingdom . | |

OTHER PUBLICATIONS

Advances in Instrum, vol. 32, No. 2, 1977, pp. 213-220, ISA, US; L. R. Thomas: Thick ∝ Film Platinum Resistance Temperature Detectors, p. 215, Paragraphs 2, 3; FIG. (III).

Hybrid Circuit Design and Manufacutre, R. D. Jones, Tektronix Laboratories Beaverton, Oregon, EEE 13; pp. 40-45; pp. 74-75; pp. 124-137.

Primary Examiner—Howard L. Williams
Attorney, Agent, or Firm—Foley & Lardner

[57] ABSTRACT

A surge protector, particularly for protecting components in a telecommunication system, has a thin ceramic substrate on a surface of which is formed a surge protector resistor having a spiral pattern in the form of a double spiral having two parallel resistor paths in series, the width of the paths and the distance between adjacent path lengths being relatively narrow. Resistance trimming links are provided for increasing the length of a resistor path, there being substantially even distribution of surge effects under surge conditions.

29 Claims, 3 Drawing Sheets

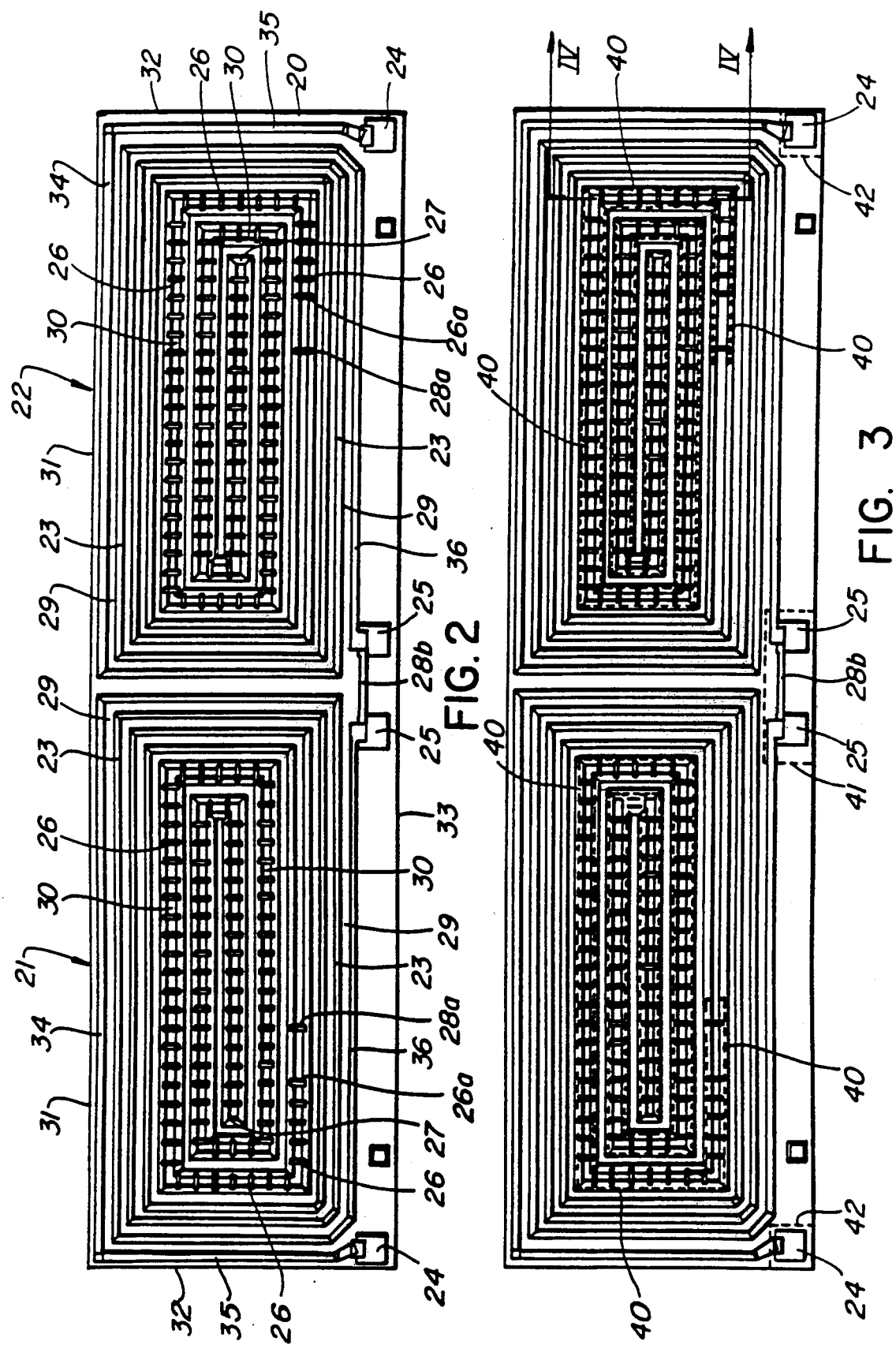

SURGE PROTECTOR FOR TELECOMMUNICATIONS TERMINALS

This application is a continuation of application Ser. No. 06/942,771, filed Dec. 17, 1986, now abandoned.

BACKGROUND OF THE INVENTION

1. Field of the Invention

This invention relates to surge protection for components in a terminal, such as a telephone set. Protection is required against AC surges which can arise due to downed AC power lines falling across telephone lines, and other occurrences.

2. Related Art

Originally, such protectors comprised a wire wound resistor. However, an overload could cause the resistor to break down in a manner which is a fire hazard. Wire wound resistors were replaced by a thick film resistor printed onto a surface of a ceramic substrate. The substrate is at least 0.1 inches thick and the resistor is a continuous layer. To trim the resistor, the layer of resist material is abraded locally, the abrasion extending through the layer to the substrate.

Developments in materials and processes enable the substrate thickness to be reduced to 0.06 inches, but disadvantages such as 100% testing resulted.

The thickness of the substrate reflects the ability of the substrate to withstand the heating resulting from a surge. Normally, a thinner substrate will disintigrate at a lower surge voltage than a thicker substrate. The effect is amplified by variation in the distribution of the surge effect over the substrate area, with an associated non-symmetrical heating of the substrate. Copending application Ser. No. 899,403, assigned to the same assignee, discloses a surge protector employing a serpentine pattern.

SUMMARY OF THE INVENTION

The present invention provides a surge protector which provides a substantially even distribution of the surge over the area of the substrate which carries the surge. The surge current, with the associated heating, is caused to flow evenly out to peripheries of the substrates. Broadly, the invention comprises a thin ceramic substrate on one surface of which is formed a surge protection resistor having a spiral path. The path is in the form of a double spiral having two thin parallel resistor paths, extending around the periphery of the substrate, spiralling inward towards the center. The central portions are connected by a plurality of spaced shorting members which provide for trimming the resistance value. In a particular arrangement, two such resistors are formed side-by-side on the one surface of the substrate. Other devices may be formed on the other surface of the substrate.

BRIEF DESCRIPTION OF THE DRAWINGS

The invention will be readily understood by the following description of certain embodiments, by way of example, in conjunction with the accompanying drawings, in which:

FIG. 2 is a plan view, greatly enlarged, of a form of surge protection member according to the present invention illustrating the resistor patterns;

FIG. 3 is a plan view as in FIG. 2, with the profile of a dielectric layer as applied to the pattern in FIG. 2;

DETAILED DESCRIPTION OF THE EMBODIMENTS

Figure 1:
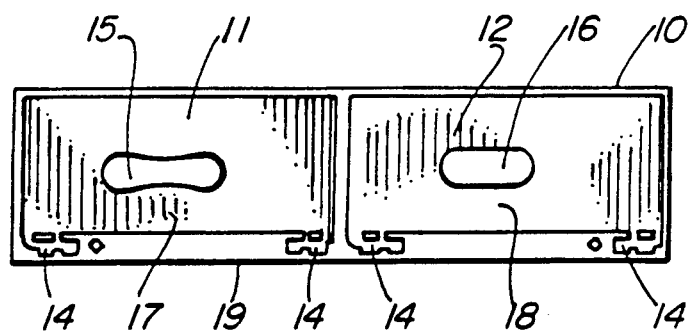
FIG. 1 is a plan view on one surface of a form of surge protector currently used in industry.

Illustrated in FIG. 1 is one form of surge protector known in the art. A ceramic substrate 10 has two surge resistors 11 and 12 formed on one surface. For telecommunications systems, protection is required for both conductors of the conventional two wire loop or feed, the Tip conductor and the Ring conductor. Two surge resistors are formed on a common substrate. The two surge resistors, 11 and 12, are of thick film form, formed by screen printing a layer of resistor material on the surface of the substrate 10. The resistor material overlies, at each end of a resistor element, a conductive stripe (not seen) which connects to a contact pad 14.

Due to process and material limitations, it is not possible to form the resistor elements 11 and 12 at exactly the right resistance value. Therefore, the elements are formed with a value which is always slightly below the required value. The layer of resistor material is then abraded locally, as by sand abrasion, to bring the resistance up to the required value. The resistor material is abraded right through to the substrate, as illustrated in FIG. 1. The abraded areas are indicated at 15 and 16. The values of the resistor elements must be within close limits of a stated datum and the two resistor elements must also be matched, or equal, to a very close limit.

A severe instability problem arises in the form of protector elements as illustrated in FIG. 1. Firstly, the surge loading, that is, the voltage and resultant current flow during surge conditions, is divided and concentrated in the two sections either side of the abraded areas 15 and 16. Added to this, because the connections are at one edge, a higher voltage and current flow occurs in the section closest to the connection edge, that is, in the sections 17 and 18. It will be appreciated that, even without the abrading at the areas 15 and 16, there would not be an even spread of the surge conditions across the elements because of the edge connections at 14. The highest loading would occur adjacent the edge 19 and would decrease across the element. Various imbalances occur, creating a thermal shock in the substrate, requiring a minimum substrate thickness, generally 0.1 inches or more.

With such a thickness, the substrates are manufactured individually. The resistor elements 11 and 12 are screen printed on substrates individually and then fused, which is slow and costly. To provide protection, the resistor elements are usually covered with a fused dielectric layer which again is applied individually. It is not generally acceptable to produce multiple protectors on larger substrates as it is difficult and expensive to make larger thick substrates. Thick substrates cannot readily be divided by scoring and breaking. Process and material developments have provided some amelioration of the surge effects and permit reduction of the depending upon requirements, while a conductor material typically has a resistance of between about 3 m ohms and 60 m ohms per square.

FIG. 2 illustrates a completed surge protector having a ceramic substrate 20 and two resistor elements 21 and 22. Each resistor element is formed of a spiral path 23 which is doubled back on itself to form a double spiral. One end of the spiral path 23 ends at a contact area 24 and the other end of the spiral path ends at a contact area 25. To provide for trimming of the resistor value, a plurality of shorting links 26 extend from the inner end 27 of the spiral. The links 26 are spaced evenly apart and are cut sequentially from link 26a, which is furthest from the inner end 27. To provide for automated trimming, a further link 28a is provided in each spiral path and also a link 28b connects the two adjacent contact areas 25. The use of these links will be explained later.

In the example, with a nominal value of 200 ohms for each resistor element, there are 775 squares of resistor material in circuit before the cutting of the link 28a. A further 545 squares of resistor material are added in by cutting all of the links 26. Cutting link 28a makes about a 1½% change in total resistor value and each further link adds in about 0.3 to 0.5% of the nominal 200 ohms resistance. This gives a total trimming potential of about 40%. The previous conventional resistors, as in FIG. 1 for example, gave a maximum of about 17% trim. The process requires about 30% trim potential for a 90% yield to cater to all the variations in manufacture.

The various embodiments of the example of resistor path 23 in FIG. 2 are as follows. The path width is 15 mil and the substrate thickness to 0.06 inches. However, because of the variation of the temperature of the substrate under surge conditions, with the possibility of disintegration, every protector is tested to the full range voltage as prescribed by specification. This is in the order of 450 volts AC RMS at 11 cycles at 60 Hz.

A further stage of development was to provide a different resistor material, a thick film nitrogen firable material, to give improved heat dissipation. It was found that the substrate could be 0.06 inches thick and testing of every resistor was not required. Because of the thinner substrate, it is possible to obtain substrates in larger sizes. A substrate size large enough to form six protectors can be obtained.

This appeared to be the limit. Disintegration still occurred at times and any further reduction in substrate thickness seemed unlikely. The abrasion trimming of the resistor elements still remained a slow, costly procedure and created a highly imbalanced thermal distribution over the substrate.

The present invention enables a major improvement by a complete break-away from previous practices. Instead of a layer of resistor material forming an element, a thin pattern or path arranged as a double spiral is used. Normally, a thin pattern or path would not be capable of sustaining a voltage surge, but be expected to rapidly burn out at the voltage surges. This is avoided by making the resistor pattern of a material which has a resistance, or conductance, between that of a resistor material and that of a conductor material. A resistor material, for example as used for the elements 11 and 12, typically has a value of about 10 ohms to 100M ohms per square, spacing 29 between the paths is 17.5 mil for that part of the spiral path outside the trim area. In the trim area, the path is 15 mil wide and the spacing, 30, is 20 mil. The links are 10 mil wide. The lengths of the path extending along the top edges 31, ends 32 and near the bottom edge 33, lengths 34, 35 and 36 respectively, can be made slightly wider, for example 20 mil. These dimensions can vary.

The term "squares" is used in the specification of sheet resistance values. It means that if a paste of 1000 ohms/square is screened into a one inch square resistor pattern, it will have a resistance of 1000 ohms from one side to the other. It will also be 1000 ohms from one side to the other if the resistor is one centimeter square or 100 mil square. The size is not important as long as the resistor is square. This is discussed in more detail in "Thick Film Technology" by Jeremy Agnew, published by Hayden Book Company, Inc. of New Jersey, particularly at pages 11, 12 and 13.

It will be appreciated that, whereas in the previously known arrangements, as in FIG. 1, resistance material is removed to raise the resistance of an element, in the present invention material is added to the resistance path to raise the resistance.

In the present invention, the resistor path extends very close to the top edge and end edges, right into the corners, and the elements are quite closely adjacent to each other. The path lengths which are always in circuit are at the peripheral areas. The special arrangement ensures that the surge effects extend uniformly, that is, there is not a concentration on one side of the element compared to the other as occurs with FIG. 1.

Under surge conditions, with the heating up of the resistor, there is a temperature gradient through the thickness of the substrate and the substrate tends to curve. With the present invention, the curve extends for the full length of the substrate and substantially all of the width and is much more regular than in the example of FIG. 1. When protectors are made in multiples from a single larger substrate, the large substrate is subdivided by laser scribing on the back surface followed by bending of the substrate. Slight cracks can occur at the edges as a result. The bending or curving of the substrate, under surge conditions, tends to close these cracks, improving the shock resistance of the substrate.

A variety of materials can be used for the resistor path, such as a ruthinium based material as sold by Electro-Science Laboratories Inc. of Pennsylvania, reference number 3900, and a silver based material as sold by Thick Film Systems Division of Ferro Corp. of Santa Barbara, Calif. The silver based material has been found very effective and is a mixture of silver and borosilicate glass, in paste form. The silver comprises about 50% by weight of the mixture, the remainder being borosilicate glass. Various small additions of other materials such as metal oxides, for example of copper, nickel, magnesium and zinc may be used to trim the final resistance value of the sintered resistor path. The basic proportions of silver and glass can be varied to vary the resistance of the resistor path.

Normally, after printing of the resistor paths and sintering or fusing of the material, a dielectric passivation layer is applied for protection. The layer extends completely over that part of the resistor pattern which does not have the links. A gap is formed over links 26, 28 and 29 and over the contact areas 24 and 25. This is illustrated in FIG. 3, the openings indicated by dotted outline at 40 for the links 26 and 28, dotted outline 41 for link 29 and contact areas 25, and dotted outline 42 for contact areas 24. Both resistor material and dielectric are sintered or fused by conventional processes, e.g. at 850° C. for about 10 minutes.

Figure 4:
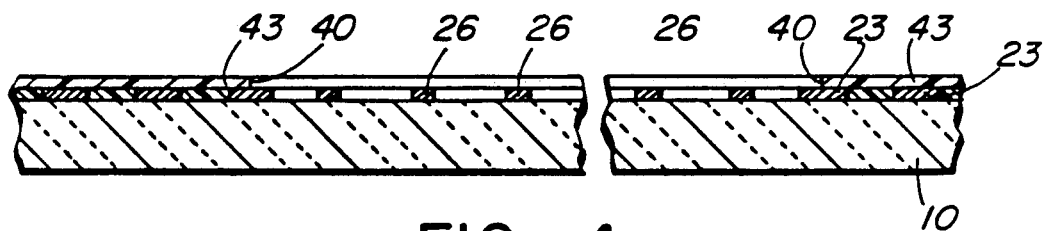
FIG. 4 is a cross-section on the lines IV—IV of FIG. 3.

FIG. 4 illustrates the dielectric layer at 43, extending over the outer paths 23, and exposing the links 26.

It is usual that additional components, such as thick film resistors and capacitors, are formed on the other surface of the substrate, the components being connected to a circuit pattern. Connections are made to the circuit pattern, and to the protector resistor elements, by terminals along one edge.

Figure 5:
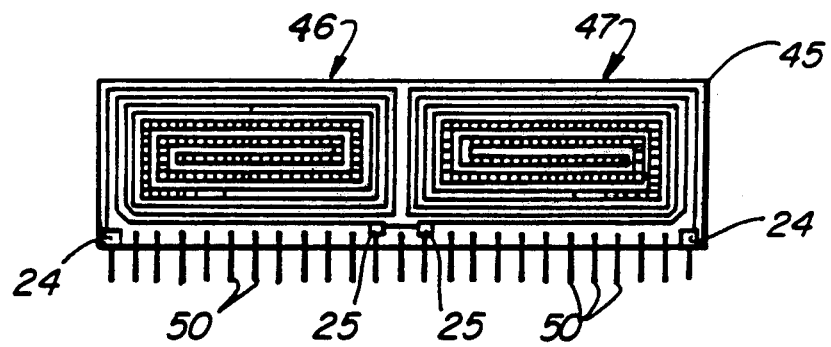
FIGS. 5 and 6 are plan views on the opposite surfaces of a completed surge protector, showing two surge resistors on one surface and various thick-film devices on the other surface, respectively.
Figure 6:
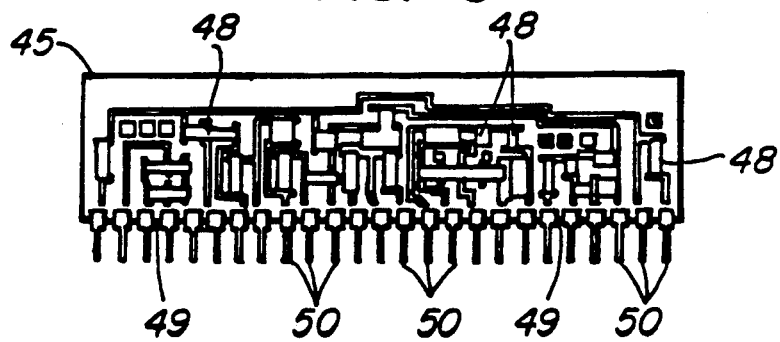

FIGS. 5 and 6 illustrate a protector, indicated generally at 45, having twin resistor elements 46 and 47 on one surface, the resistor elements being as in FIGS. 2, 3 and 4. On the other surface, components indicated at 48 are formed. Contact pads 49 are also formed and terminals 50 are attached, by soldering, to the pads 49. Appropriate terminals also connect to the contact areas 24 and 25 for the resistor elements.

Typical values for the resistor elements of a protector as exemplified are 200 ohms resistance ±0.5%, with the two resistors matched to ±0.5%. The temperature coefficient of resistance (TCR) is within the limits of about +100 ppm. With the present invention, a TCR within 40 ppm has been obtained regularly. The continuous power rating is 2000 mW. The thickness of the substrate is 0.04 inches, with 0.025 inches thickness also being possible. Substrates of 0.04 inches thick enable a large substrate of up to 5 by 6 inches to be used enabling fourteen protectors to be made per substrate. This thickness of substrate can readily be scored, as by a laser, and broken into separate protectors. The cost of substrates decreases with reduction in thickness and the cost of manufacture decreases with the increase in the number of protectors which can be made at one time.

A line or path width down to 5 mil and a spacing of 5 mil can be used. For resistor elements having a lower resistance, for example 100 ohms, wider lines and spaces can be used, for example 40 mil. Line or path widths and spacing from 5 mil to 100 mil can be used, and the paths and spacing can be equal or not, as desired. A variety of line widths and spacing can be used, as in the particular example described above.

The use of a spiral resistor pattern having relatively narrow paths and spaces, which is contrary to what would be expected, together with trimming links, provides a surge protector having improved thermal characteristics under surge conditions. The resistors can be made to a high standard specification on relatively thin substrates. It enables the use of large area, e.g. 5"×6", substrate material already manufactured for thick film substrates, which use 0.04 and 0.025 inch material. There is a much reduced likelihood of disintegration and minimal testing is required.

Figure 7:
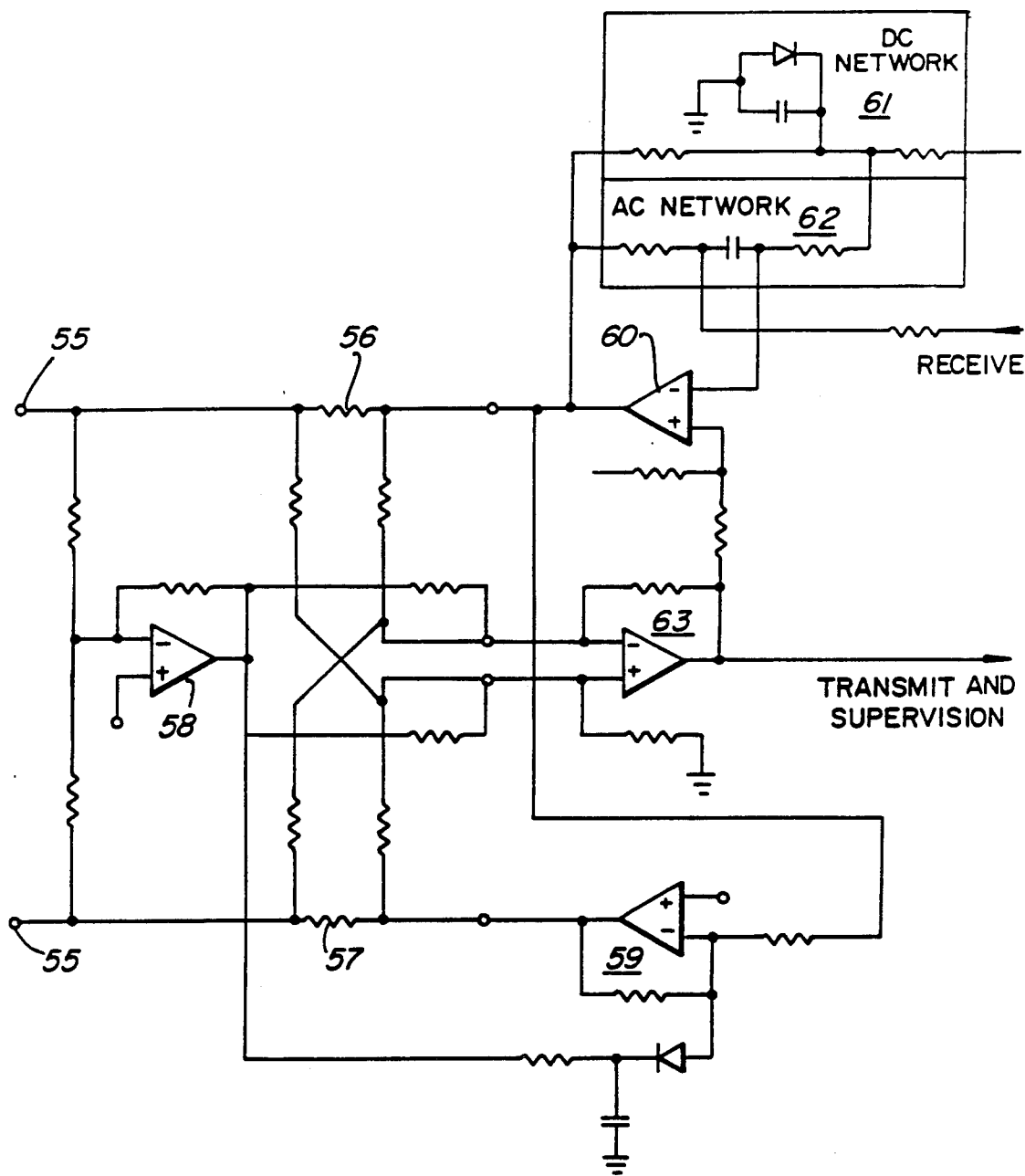
FIG. 7 is an illustration of one form of circuit embodying the invention.

FIG. 7 illustrates one form of line-card circuit as used in a telecommunications system. This circuit is described in more detail in U.S. Pat. No. 4,571,460, issued Feb. 18, 1986, in the name of the present assignee. In the figure, connection to the telephone lines, from the line card, is made at 55. The surge protection resistors, corresponding to resistor elements 21 and 22 of FIGS. 2 and 3, are indicated at 56 and 57 in FIG. 7. The resistors 56 and 57 act to protect the circuit components against surges occurring on the telephone lines and inputting at the connections 55. Briefly describing other parts of the circuit in FIG. 7, a DC amplifier is shown at 58, a ring amplifier circuit at 59, a tip amplifier at 60, a DC network at 61, an AC network at 62 and a control circuit at 63.

The trimming of the resistors is carried out by a laser under the control of a controller, or computer. The substrate with resistor elements thereon is positioned in a holder and the trimming cycle started. Probes associated with the controller contact the contact areas 24 and 25, applying an electrical power source to the contacts. The laser beam is aligned with the space between the contact areas 25 and moves forward, normal to the edge of the substrate until it meets link 28b. The controller has detected a short between contact areas 25. The laser beam cuts across the link 28b. Immediately the link is cut, the controller detects the removal of the short and simultaneously has the location of the laser beam in relation to the resistor pattern along the axis, for convenience the Y axis, normal to the long edge of the substrate. The laser beam is switched off and the laser head is progressed along the Y axis until aligned with the space in which the links 28a are positioned. The laser head then moves along this space in one direction, for example to the right in FIG. 2. The laser beam is switched on while traversing this gap and eventually comes to and cuts the link 28a. Immediately the link 28a is cut, the controller registers a change in resistance and simultaneously has the location of the laser beam in the direction parallel to the long edge of the substrate, and also relative to the pattern, for convenience the X axis. The laser is now completely orientated by the controller and can continue cutting links 28, until the controller detects that the correct resistance exists. The beam is shut off and the laser head is moved across to the space in which the other link 28a is positioned. The steps are repeated—beam on, link 28a cut, cutting detected and links 28 cut to give the correct value.

The invention has been described particularly to the advantages in that substrates of thinner material can be used. However, the invention can also be applied to normal, relatively thick, substrates as the advantages of ease of manufacture, particularly in the laser trimming, can be obtained.

While several embodiments of the invention have been described, it will be understood that it is capable of further modification, and this application is intended to cover any variations, uses, or adaptation of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A surge protector having substantially even distribution of surge effects, including heat distribution, over the area carrying the surge, comprising:
   a ceramic substrate;
   a spiral electrically resistive pattern formed on one surface of the ceramic substrate, the pattern being in the form of a double spiral having first and second physically parallel resistor paths, joined in series, the first of the paths having path lengths located between path lengths of the second path;
   the width of the path and the distance between adjacent path lengths being relatively narrow; and
   trimming means located at a central portion of the double spiral for increasing the length of a resistive path, the trimming means comprising shorting links extending between the first and second physically parallel paths, the first and second paths as adjusted by the trimming means providing a path for substantially uniform heat dissipation from the central portion of the spiral path to edge portions of the substrate.

2. A surge protector as claimed in claim 1, wherein the first and second parallel resistor paths extend around at least part of the periphery of the substrate and spiral inward towards the center, to an inner end.

3. A surge protector as claimed in claim 2, wherein the first and second parallel paths are connected at the inner end.

4. The surge protector recited in claim 1, where substrate curving from surge induced temperature gradients through a thickness of the substrate extends across substantially all the width of the substrate, thereby reducing substrate cracking under surge conditions.

5. A surge protector as claimed in claim 1, wherein said shorting links are spaced at substantially equal distances apart.

6. A surge protector as claimed in claim 1, wherein said ceramic substrate has a thickness of between about 0.025 inches and 0.100 inches.

7. A surge protector as claimed in claim 1, wherein said ceramic substrate has a thickness of between about 0.025 inches and 0.04 inches.

8. A surge protector as claimed in claim 1, wherein each path has a width between about 5 mil and 100 mil.

9. A surge protector as claimed in claim 1, wherein said distance between adjacent path lengths is between about 5 mil and 100 mil.

10. A surge protector as claimed in claim 1, wherein said path width and said distance between adjacent path lengths is substantially equal.

11. A surge protector as claimed in claim 1, wherein said distance between adjacent path lengths is wider than said path width.

12. A surge protector as claimed in claim 1, including a protection layer over said spiral pattern.

13. A surge protector as claimed in claim 12, including means gaining access to said trimming means.

14. A surge protector as claimed in claim 13, wherein said access gaining means are openings in said protection layer.

15. The surge protector of claim 1 wherein a first parallel spiral path of electrically resistive material is doubled back on itself to form a second parallel spiral path of electrically resistive material.

16. The surge protector recited in claim 1, wherein the trimming means located at the central portion of the double spiral places path lengths at peripheral areas always in circuit, thereby extending surge effects uniformly across the surge protector without concentrating the surge effects on any side of the protector.

17. A method of protecting components in a telecommunications system and the like from voltage surges, comprising:
    placing a narrow spiral electrically resistive path, in the form of a double spiral having first and second physically parallel paths joined in series at an inner end of the double spiral on a surface of a ceramic substrate to provide substantially uniform distribution of effects, including heat distribution, under voltage surge conditions, from a central portion of the double spiral to edge portions of the substrate;
    placing said resistive path in an electrical line between a voltage source and a component to be protected.

18. The method of claim 17 including varying the path by placing a plurality of links between said parallel paths.

19. The method of claim 18 including cutting said links for increasing the length of the resistive path.

20. The method of claim 18 including placing a protective coating over said resistive path.

21. The method of claim 20 including providing openings in said coating for gaining access to said links.

22. The method of claim 17 including varying the path by increasing the length of said resistive path.

23. The method of claim 22, wherein said increasing step includes placing a plurality of links between said parallel paths and cutting selected ones of said links.

24. The method of claim 23 further comprising sequentially cutting links beginning at the link farthest from an inner end of the double spiral.

25. The method of claim 17 including forming said substrate of a ceramic material having a thickness of between about 0.025 inches and 0.1 inches.

26. The method of claim 17 including forming said substrate of a ceramic material having a thickness of between about 0.025 inches and 0.04 inches.

27. The method of claim 17 including forming the path width of between about 5 mil and 100 mil.

28. The method of claim 17 including placing adjacent path lengths between about 5 ml and 100 mil apart.

29. The method of claim 17 further comprising forming the double spiral by doubling back the electrically resistive path on itself to form a second spiral path parallel to a first spiral path.

* * * * *